(12) United States Patent
Hafellner et al.

(10) Patent No.: US 12,103,455 B2
(45) Date of Patent: Oct. 1, 2024

(54) DUMMY ELEMENT HAVING AN ILLUMINANT

(71) Applicant: 4ACTIVESYSTEMS GMBH, Traboch (AT)

(72) Inventors: Reinhard Hafellner, Spielberg (AT); Martin Fritz, Kobenz (AT)

(73) Assignee: 4ACTIVESYSTEMS GMBH, Traboch (AT)

( * ) Notice: Subject to any disclaimer, the term of this patent is extended or adjusted under 35 U.S.C. 154(b) by 0 days.

(21) Appl. No.: 17/616,660

(22) PCT Filed: Jun. 5, 2020

(86) PCT No.: PCT/EP2020/065665
§ 371 (c)(1),
(2) Date: Dec. 5, 2021

(87) PCT Pub. No.: WO2020/245387
PCT Pub. Date: Dec. 10, 2020

(65) Prior Publication Data
US 2022/0161711 A1   May 26, 2022

(30) Foreign Application Priority Data

Jun. 7, 2019 (DE) ............ 10 2019 115 539.8

(51) Int. Cl.
*B60Q 1/00* (2006.01)
*B60Q 1/04* (2006.01)
(Continued)

(52) U.S. Cl.
CPC ......... *B60Q 1/0023* (2013.01); *B60Q 1/0408* (2013.01); *F21S 9/02* (2013.01);
(Continued)

(58) Field of Classification Search
CPC .. B60Q 1/0023; B60Q 1/0408; B60Q 1/0041; B60Q 1/00; F21V 29/00; G01P 15/00;
(Continued)

(56) References Cited

U.S. PATENT DOCUMENTS 9,355,576 B2   5/2016   Fritz
9,870,722 B2   1/2018   Fritz et al.
(Continued)

FOREIGN PATENT DOCUMENTS

DE   102011012542 A1   8/2012
DE   102012110586 A1   4/2014
(Continued)

OTHER PUBLICATIONS

English Translation, KR 20120041954, May 3, 2012, Park (Year: 2012).*

(Continued)

*Primary Examiner* — Peggy A Neils
(74) *Attorney, Agent, or Firm* — Robert A. Blaha; Smith Tempel Blaha LLC

(57) ABSTRACT

The present invention relates to a dummy element, in particular a dummy vehicle, comprising a dummy body having an illumination area which simulates an illumination device to be simulated of an element to be simulated, in particular a vehicle, the illumination area having on its surface graphic contours which reproduce a frame of the Illumination device to be simulated, and an illuminant, wherein the dummy body comprises, in the Illumination area, an opening in which the illuminant is arranged.

19 Claims, 3 Drawing Sheets

(51) Int. Cl.
  *B62J 6/022*      (2020.01)
  *F21S 9/02*       (2006.01)
  *F21V 19/00*      (2006.01)
  *F21V 29/50*      (2015.01)
  *F21Y 115/10*     (2016.01)
  *G01P 15/00*      (2006.01)

(52) U.S. Cl.
  CPC ........ *F21V 19/0015* (2013.01); *F21V 19/004* (2013.01); *F21V 29/50* (2015.01); *G01P 15/00* (2013.01); *B62J 6/022* (2020.02); *F21Y 2115/10* (2016.08)

(58) Field of Classification Search
  CPC . F21Y 2115/10; G01M 17/007; G01M 17/00; G01M 17/0078; G09B 25/02; G09B 25/00; F21S 41/00; F21S 41/19; F21S 43/00
  See application file for complete search history.

(56) References Cited

U.S. PATENT DOCUMENTS

| | | | |
|---|---|---|---|
| 10,352,826 B2 | 7/2019 | Fritz et al. | |
| 10,955,313 B2 | 3/2021 | Hafellner et al. | |
| 11,092,515 B2 | 8/2021 | Hafellner et al. | |
| 11,125,651 B2 | 9/2021 | Hafellner et al. | |
| 2007/0171667 A1* | 7/2007 | Watanabe | F21S 43/195 362/544 |
| 2014/0014473 A1 | 1/2014 | Zecha et al. | |
| 2014/0102224 A1 | 4/2014 | Fritz | |
| 2015/0210129 A1 | 7/2015 | Schulte | |
| 2015/0317917 A1 | 11/2015 | Fritz et al. | |
| 2016/0054199 A1 | 2/2016 | Fritz et al. | |
| 2017/0315022 A1 | 11/2017 | Simadar et al. | |
| 2018/0306676 A1 | 10/2018 | Wimmer | |
| 2019/0106047 A1* | 4/2019 | Hartenstein | B60Q 1/0035 |
| 2019/0219486 A1 | 7/2019 | Hafellner et al. | |
| 2019/0257717 A1 | 8/2019 | Hafellner et al. | |
| 2020/0003658 A1 | 1/2020 | Hafellner et al. | |

FOREIGN PATENT DOCUMENTS

| | | | | |
|---|---|---|---|---|
| DE | 102016108138 A1 | | 11/2017 | |
| DE | 102016112518 A1 | | 1/2018 | |
| EP | 3242120 A1 | | 11/2017 | |
| GB | 2530307 | | 3/2016 | |
| KR | 20100051419 | * | 5/2010 | ............ B62D 65/02 |
| KR | 20120041954 | * | 5/2012 | ............ F21S 43/145 |
| WO | 2013070153 | | 5/2013 | |
| WO | WO2016015074 | * | 2/2016 | ................ F21S 4/00 |

OTHER PUBLICATIONS

English Translation, WO2016015074, Feb. 4, 2016, Bertlwieser (Year: 2016).*
KR 20100051419, Jae Won Lee, May 17, 2010, English Translation (Year: 2010).*
English translation of KR20100051419A as generated by the European Patent Office.
WIPO, Internationalen Recherchengerichts und des Schriftlichen Bescheids der Internationalen Recherchenbehörde Oder Der Erklärung (International Search Report); Internationale Recherchenbehörde; PCT/EP2020/065665, Sep. 11, 2020.
EP 3 242 120 A1; machine translation; Espacenet; Nov. 8, 2017.
DE 10 2016 112 518; machine translation; Espacenet; Jan. 11, 2018.
DE 10 2016 108 138; machine translation; Espacenet; Nov. 2, 2017.
DE 10 2012 110 586; machine translation; Espacenet; Apr. 17, 2014.
DE 10 2011 012 542 A1; machine translation; Espacenet; Aug. 30, 2012.
WIPO, Schriftlicher Besscheid der Internationalen Recherchenbehorde, PCT/EP2020/065665, Sep. 14, 2020.

* cited by examiner

DUMMY ELEMENT HAVING AN ILLUMINANT

This application is the U.S. national phase of International Application No. PCT/EP2020/065665 filed 5 Jun. 2020 which designated the U.S. and claims priority to German Patent Application No. 10 2019 115 539.8 filed 7 Jun. 2019, the entire contents of each of which are hereby incorporated herein by reference.

TECHNICAL FIELD

Embodiments of the present invention relate to a dummy element, and more particularly to a dummy vehicle having an illuminant (lighting means, light source).

BACKGROUND

For testing driver assistance systems, in particular from the point of view of autonomous driving, complex traffic situations have to be reproduced and simulated. For this purpose, a large number of different dummy elements are moved in relation to each other and controlled, in particular, based on GPS data. Since a large number of dummy elements are required to simulate complex traffic situations and accidents are frequently caused between a test vehicle and the dummy elements, the dummy elements must be robust and must be able to be reused after a crash.

In order to realistically simulate dummy elements, in particular vehicle dummies, active components, such as the illumination devices, i.e. the headlights or turn signals of a vehicle, are installed in a dummy body. In this regard, the illumination devices have corresponding rigid housings and frames in which an illuminant is installed to realistically simulate a headlight device of a vehicle. The corresponding housings and frames are installed in correspondingly sized openings in the dummy element. Since the housings and frames are usually harder than the material of the dummy body, damage is often caused to the dummy body itself as well as to the test vehicle used to cause an accident.

DESCRIPTION OF THE INVENTION

There may be a need to form an illumination device robustly and realistically in a dummy element.

This need may be met by the features of the independent claim.

According to a first aspect, a dummy element, in particular a dummy vehicle, is described. The dummy element comprises a dummy body having an illumination area (lighting region) which simulates an illumination device to be simulated of an element to be simulated, in particular a vehicle. Furthermore, the dummy element comprises an illuminant which is designed (formed) without a housing, wherein the dummy body comprises, in the illumination area, an opening (aperture) in which the illuminant is arranged.

According to an exemplary embodiment, the dummy element is a two-wheeler, a motorcycle or a bicycle, a motor vehicle, in particular a passenger car or a truck, a human dummy or an animal dummy.

In particular, the illumination area and illuminant simulate headlights, turn signals, or brake lights of a vehicle. For example, the illumination area and illuminant may also simulate a headlamp of a human dummy.

The illuminant is designed without a housing or frame. Without a housing or frame in particular means that no housing and no frame, which are present in the opening, are formed around the illuminant itself. Only the illuminant, such as an LED or light bulb, is located in the opening. Due to a deformation of the base body in the event of an impact, damage to rigid components of an illuminant, such as its housing or its frame, is thus prevented.

Thus, the dummy body does not have a bulge in which a headlamp housing or a headlamp frame is usually present, but only a smaller opening in which exclusively the illuminant is present.

Furthermore, reflectors or mirror elements may be arranged in the illumination area, in particular on its surface, for example by means of adhesive bonding.

According to an exemplary embodiment, the illumination area has graphic contours on its surface, which, for example, reproduce a frame of the illumination device to be simulated. In order to simulate the illuminant as realistically as possible, graphic contours may reproduce or replicate the frame or the housing of the illumination device to be simulated.

According to an exemplary embodiment, the illuminant is fixed in the opening by means of a press fit (interference fit).

According to an exemplary embodiment, the opening and the illuminant form a clearance fit so that the illuminant is retractable (can be slid or pushed) into the opening in a drawer-like manner.

According to an exemplary embodiment, the illuminant is fixed in the opening by means of an adhesive connection.

According to an exemplary embodiment, the illuminant is fixed in the opening by means of a form fit (positive fit).

According to an exemplary embodiment, the illuminant comprises a luminous body (luminous element) and a circuit board, wherein the luminous body protrudes from the circuit board.

According to an exemplary embodiment, the circuit board is elastically deformable.

For example, the circuit board may be a flexible (in particular printed) tape or flexible (in particular printed) film, which for example have electronic conductor tracks and electronic components (e.g. LED elements). The (printed) circuit board may thus be formed to be elastic or flexible or plastically deformable. For example, if a collision occurs between two dummy bodies, the deformable circuit board may deform elastically or plastically without being damaged. Afterwards, the deformable circuit board may be restored to an initial state (initial shape). Thus, in the context of the present document, the term "deformable" may be understood to mean, in particular, a property on the basis of which a body may be brought back to an initial shape after the application of a force leading to a deformation or may be brought back automatically. This has the advantage that, for example, damaged elements of a dummy body may be reused in the context of a crash test and such tests may thus be carried out efficiently and inexpensively.

According to an exemplary embodiment, the circuit board is fixed within the opening of the dummy body and the luminous body protrudes or projects from the opening. In other words, the opening may be provided as a hole in the dummy body, wherein the circuit board is present in the hole and the luminous body is present in the region of the opening. In this regard, the luminous body may be present within the opening or may protrude from the opening.

If the luminous body protrudes from the opening, this has the advantage that a light cone close to reality is produced. Thus, a simulation for which the dummy body is used may be improved.

According to an exemplary embodiment, the opening has an outlet region (exit region) in the dummy body through which the luminous body projects outwardly (as viewed from the fastening region), and has a fastening region (attachment region, mounting region) in the dummy body at which the circuit board is present.

The outlet region is formed within the dummy body and describes the region within the dummy body in which the luminous body, for example the LED or the LEDs, is present.

According to an exemplary embodiment, the opening has an outlet region in the dummy body into which the luminous body, in particular LED, fastened on the circuit board projects, and has a fastening region in the dummy body at which the circuit board is present. In this case, the luminous body lies completely within the outlet region and does not project out of the opening towards the surrounding area.

In another exemplary embodiment, the opening may be understood as a light-transparent opening. This means that the outlet region is filled, for example, by an additional light-transparent material or is covered by a light-transparent area of the dummy body. Light from the luminous body, in particular from the LEDs, thus radiates into the surrounding area through the closed opening of the dummy body.

According to an exemplary embodiment, the opening diameter of the outlet region is smaller than the opening diameter of the fastening region so that the fastening region forms an undercut, wherein the dummy body is designed to be elastically deformable in such a way that the circuit board may be pressed through the outlet region and, when present in the fastening region, forms a form fit for fastening the illuminant.

According to an exemplary embodiment, the illuminant comprises a plurality of luminous bodies, in particular LEDs, coupled to (and in particular attached to a surface of the circuit board and protruding therefrom) the circuit board, wherein the opening in the dummy body comprises a plurality of outlet regions, wherein one of the luminous bodies is arranged in each outlet region.

In this case, the luminous bodies lie completely within the corresponding outlet regions and do not protrude from the opening or the outlet regions towards of the surrounding area of the dummy body. Alternatively, the luminous bodies may be arranged in such a way that the luminous bodies extend through the outlet regions and protrude from the opening into the surrounding area.

According to an exemplary embodiment, the opening is a through opening and connects an inner portion of the dummy body to the surface of the illumination area, wherein the illuminant is insertable through the openings from the inside.

According to an exemplary embodiment, the illuminant comprises an LED, in particular an LED matrix.

According to an exemplary embodiment, the dummy body is a foamed plastic.

According to an exemplary embodiment, the graphic contours are applied to the surface of the illumination area by means of a colorant.

According to an exemplary embodiment, the graphic contours are applied to the surface of the illumination area by means of stickers.

According to an exemplary embodiment, the illuminant has supply cables to which an energy source (power source) is connectable (may be connected).

According to an exemplary embodiment, the illuminant comprises a battery as an energy source.

According to an exemplary embodiment, the illuminant comprises an induction coil by means of which energy may be supplied to the illuminant.

According to an exemplary embodiment, the illuminant comprises a signal transmitter, wherein the signal transmitter is configured to receive control signals for controlling the illuminant.

According to an exemplary embodiment, the illuminant comprises an acceleration sensor so that accelerations and decelerations may be measured.

According to a further embodiment, the dummy element comprises a cooling device. The cooling device may be thermally coupled to a cooling device on the side of the circuit board facing away from the luminous body. For example, the cooling device may comprise a water cooling device, an air cooling device or a thermoelectric cooling device (in particular a Peltier element). Also, the cooling device may advantageously comprise a combination of different cooling means. The waste heat produced by the luminous body may thus be efficiently dissipated. This has the advantage that the life cycle of the luminous body as well as of the circuit board is prolonged, and a safe and reliable use of an illuminant comprising a luminous body and/or a circuit board is ensured.

The cooling device comprises, for example, a heat sink which is detachably attached, for example by means of a screw connection or by means of an adhesive connection, to one side of the circuit board and is thus thermally coupled, Between the heat sink and the circuit board, for example, a thermally conductive layer may be provided, which is formed, for example, by means of a thermally conductive paste. The heat sink may further comprise fluid conduits through which a cooling medium, such as a cooling liquid or a cooling gas, is conveyed.

In accordance with another aspect of the present invention, a system for moving a dummy element is described. The system comprises a dummy element described above and a movable platform, wherein the dummy element is fastened (mounted) on the movable platform.

According to another exemplary embodiment of the system, the dummy element comprises a first interface and the movable platform comprises a second interface, wherein the first interface and the second interface are configured to correspond to each other such that particular data signals or energy are interchangeable between the platform and the dummy element.

For example, the interfaces may be configured to transfer energy between the dummy element and the platform. For example, the interfaces may form corresponding coils so that energy may be transferred inductively. Further, the interfaces may form electrically conductive sliding contacts. Further, the interfaces may form corresponding plug/box connections. Furthermore, the interfaces may serve for the exchange of data signals so that, for example, control signals for the illuminant may be transmitted or status data of the illuminant may be transmitted to the platform.

It should be noted that the embodiments described herein represent only a limited selection of possible embodiments of the invention. Thus, it is possible to combine the features of individual embodiments in a suitable manner, so that a plurality of different embodiments is to be regarded as obviously disclosed to the person skilled in the art with the embodiments made explicit herein. In particular, some embodiments of the invention are described with device claims and other embodiments of the invention are described with method claims. However, it will immediately become apparent to the person skilled in the art upon reading this application that, unless explicitly stated otherwise, in addition to a combination of features belonging to one type of subject matter of the invention, any combination of features belonging to different types of subject matter of the invention is also possible.

BRIEF DESCRIPTION OF THE DRAWINGS

In the following, for further explanation and for a better understanding of the present invention, embodiments are described in more detail with reference to the accompanying drawings.

DETAILED DESCRIPTION OF EXEMPLARY EMBODIMENTS

Figure 1:
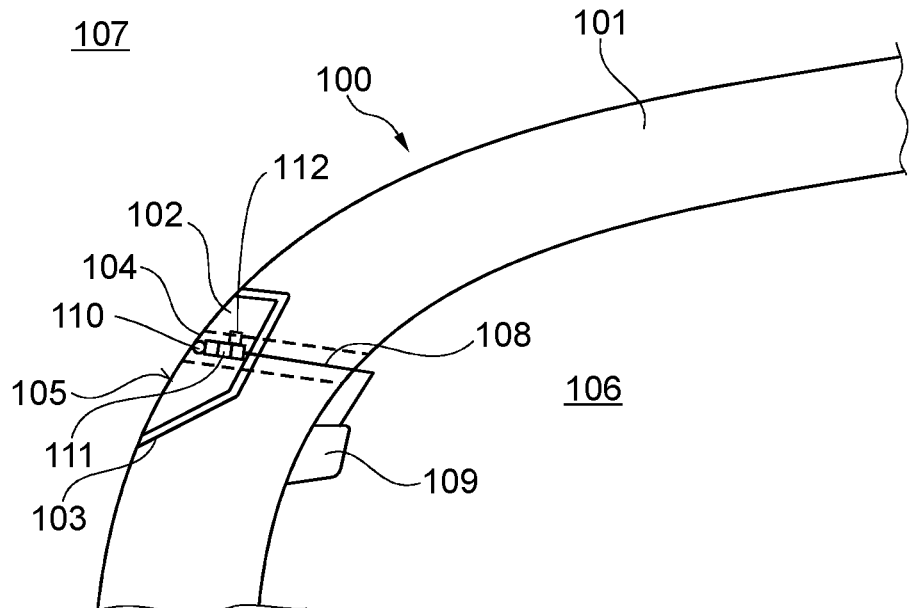
FIG. 1 is a schematic illustration of a section of a dummy element, wherein the opening is configured as a through opening, according to an exemplary embodiment of the present invention.

The same or similar components in different figures are provided with the same reference numerals. The illustrations in the figures are schematic.

FIG. 1 shows a schematic illustration of a section of a dummy element 100, wherein the opening 104 is formed as a through opening. The dummy element 100 is, for example, a motor vehicle wherein a sectional view of the front portion is shown, in FIG. 1. The dummy element 100 comprises a dummy body 101 having an illumination area 102 which simulates an illumination device to be simulated of an element to be simulated, in particular a vehicle. The illumination area 102 has graphic contours 103 on its surface which reproduce a frame of the illumination device to be simulated, and an illuminant 110. The illuminant 110 is designed without, a housing. The illuminant comprises an acceleration sensor 112 so that accelerations and decelerations may be measured. The dummy body 101 has an opening 104 in the illumination area 102 in which the illuminant 110 is arranged.

In particular, the illumination area 102 and the illuminant 110 simulate headlights, turn signals, or brake lights of a vehicle.

The opening 104 is, for example, a through opening and connects an inner portion 106 of the dummy element 101 to the surface 105 of the illumination area 102, which faces the surrounding area 107 of the dummy element 100. The illuminant 110 may be inserted through the openings 104 from the inside.

The illuminant 110 comprises supply cables to which an energy source 100 is connectable.

The illuminant 110 further comprises a signal transmitter 111, wherein the signal transmitter 111 is configured to receive control signals for controlling the illuminant 110.

Figure 2:
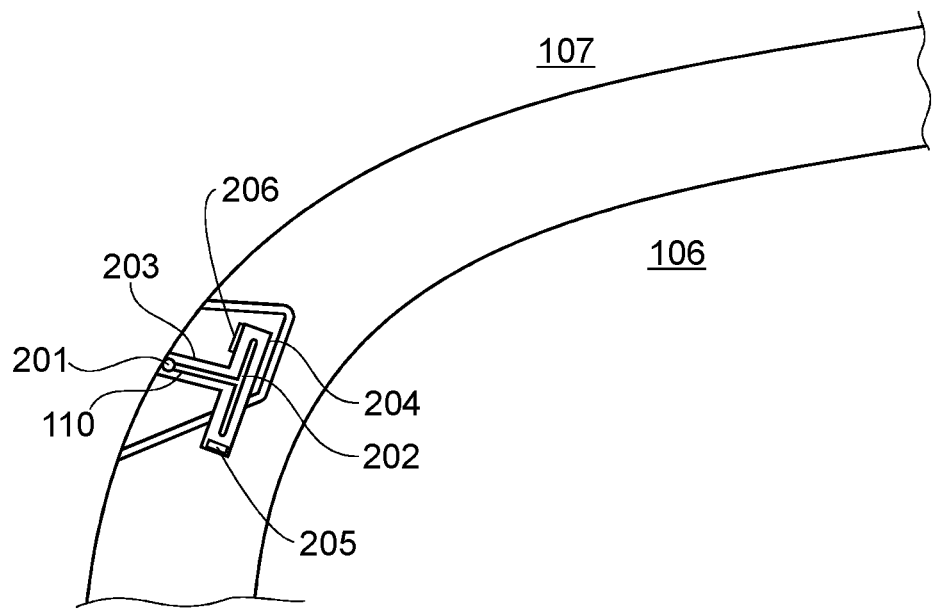
FIG. 2 is a schematic illustration of a section of a dummy element, wherein the opening is formed as a blind hole with an undercut, according to an exemplary embodiment of the present invention.

FIG. 2 shows a schematic illustration of a section of a dummy element 100, wherein the opening 104 is formed as a blind hole with an undercut. The dummy element 100 is, for example, a motor vehicle wherein a sectional view of the front portion is shown in FIG. 2. Here, the illuminant 110 is fixed in the opening 104 by means of a form fit.

The illuminant 110 comprises a luminous body 201 and a circuit board 202, wherein the luminous body 201 protrudes from the circuit board 202. A corresponding embodiment of the illuminant 110 may also be used in the through hole 104 of FIG. 1. In particular, the circuit board 202 is configured to be elastically deformable.

The circuit board 202 is fixed within the opening 104 of the dummy body 101, and the luminous body 201 protrudes or projects from the opening 104. In other words, the opening 104 may be provided as a hole in the dummy body 101, wherein the circuit board 202 is present in the hole and the luminous body 201 is present in the region of the opening 104. In this regard, the luminous body 201 may be present within the opening 104 or may protrude from the opening 104.

The opening 104 has, in the dummy body 101, an outlet region 203 through which the luminous body 201 projects outwardly, and, in the dummy body 101, a fastening region 204 at which the circuit board 202 is present. A cooling device 205 is arranged at a side of the circuit board 202 facing away from the luminous body 201. The opening diameter of the outlet region 203 is smaller than the opening diameter of the fastening region 204, so that the fastening region 204 forms an undercut. The illuminant 110 comprises an induction coil 206 by which energy may be supplied to the illuminant 110. The dummy body 101 is formed to be elastically deformable such that the circuit board 202, which may itself be elastically deformable, may be pressed through the outlet region 203 and, when present in the fastening region 204, forms a form fit for fastening the illuminant 110.

Additionally, according to an embodiment of the present invention, a cooling device may be thermally coupled on the side of the circuit board 202 facing away from the luminous body 201. For example, the cooling device may comprise a water cooling, an air cooling or a thermoelectric cooling (in particular a Peltier element). Also, the cooling device may advantageously comprise a combination of different cooling systems.

Figure 3:
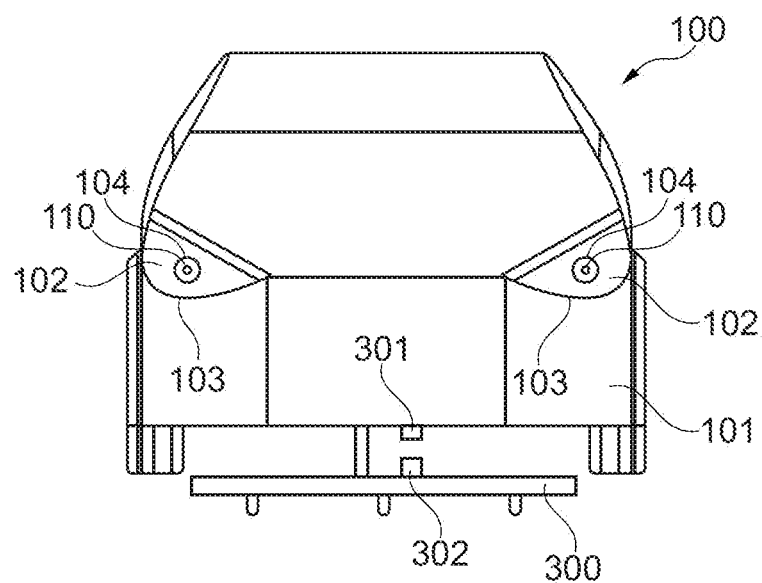
FIG. 3 is a schematic illustration of a front portion of a car dummy, according to an exemplary embodiment of the present invention.

FIG. 3 shows a schematic illustration of a front portion of a car dummy as a dummy element 100. The dummy element 100 is fastened on a movable platform 300.

The dummy element 100 has a first interface 301 and the movable platform 300 has a second interface 302, wherein the first interface 301 and the second interface 302 are configured to correspond to each other such that particular data signals or energy are interchangeable between the platform 300 and the dummy element 100.

Figure 4:
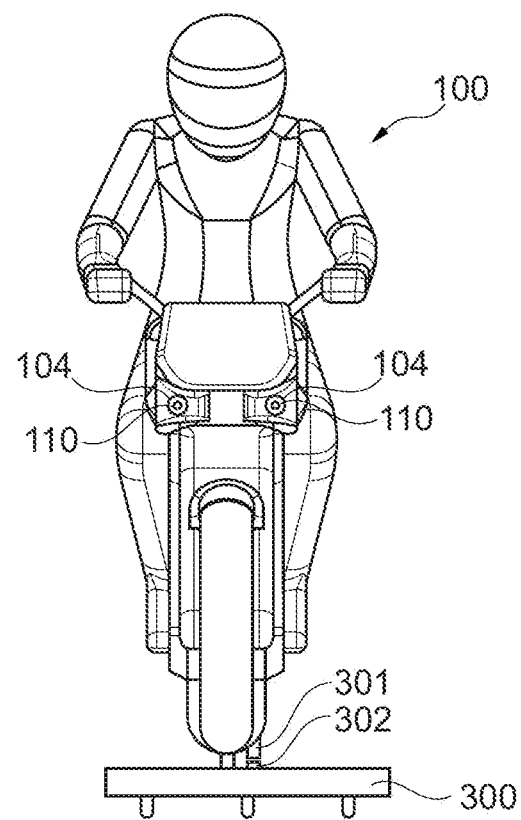
FIG. 4 is a schematic illustration of a front portion of a motorcycle dummy, according to an exemplary embodiment of the present invention.

FIG. 4 shows a schematic illustration of a front portion of a motorcycle dummy as a dummy element 100. The dummy element 100 is fastened on a movable platform 300.

The dummy element 100 has a first interface 301 and the movable platform 300 has a second interface 302, wherein the first interface 301 and the second interface 302 are configured to correspond to each other such that particular data signals or energy are interchangeable between the platform 300 and the dummy element 100.

Figure 5:
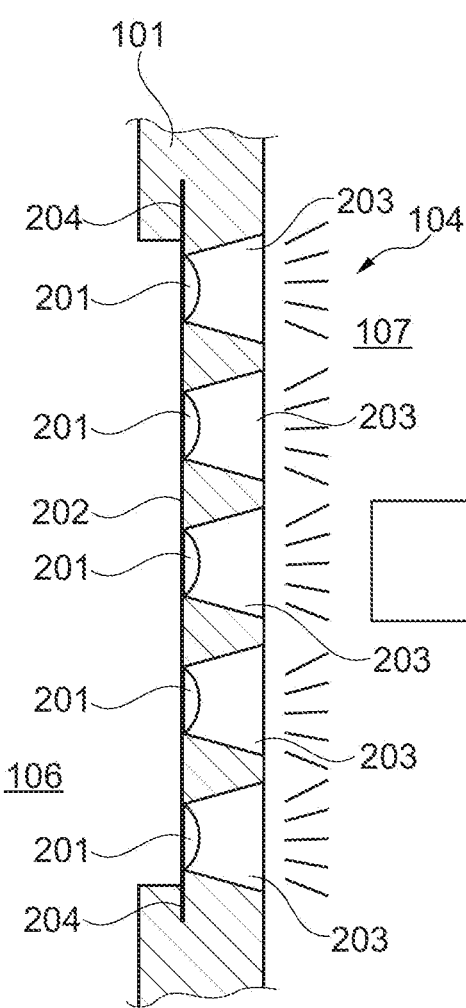
FIGS. 5 and 6 are schematic illustrations of a section of a dummy element having a plurality of openings for luminous bodies, according to an exemplary embodiment of the present invention.
Figure 6:
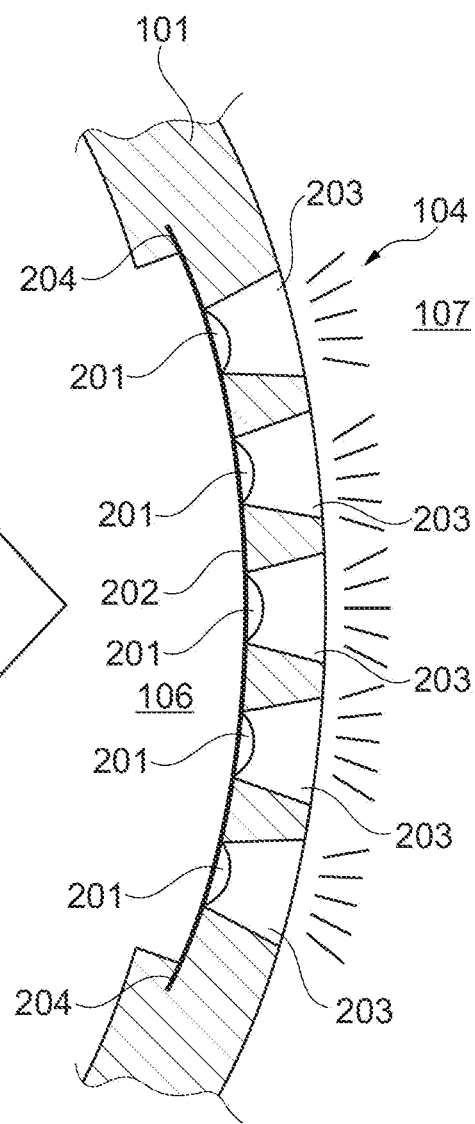

FIG. 5 and FIG. 6 show a section of a dummy element 100, wherein the opening 104 comprises a plurality of outlet regions 203 for luminous bodies 201, in particular LEDs. The LEDs may thus form a predetermined LED array. The outlet regions 103 may be round, oval or rectilinear or in the shape of a slot or slit. The circuit board 201 is attached to the dummy body 101 towards the inner side 106. The luminous bodies 201 project from the circuit board 101 towards the surrounding area 107. The luminous bodies 201 may be located in the outlet regions 203 or project therefrom towards the surrounding area 107. The fastening region 204 is formed in the shape of a slot and holds the circuit board 202 in place in a form-fitting manner.

In FIG. 5, the dummy body 101 is shown in the non-deformed state. In FIG. 6, the dummy body 101 is shown in the deformed state. Due to the number of outlet regions 203 in the dummy body 101, the dummy body 101 is, for example, readily deformable in this region. Furthermore, the circuit board 202 is formed to be elastically deformable and may deform along with the dummy body 101. Thus, the embodiment example provides a good elastic deformability of the dummy body 101 in the illumination area 102.

Supplementally, it should be noted that "comprising" does not exclude other elements or steps and "a" or "an" does not exclude a plurality. It should further be noted that features or steps that have been described with reference to any of the above embodiments may also be used in combination with other features or steps of other embodiments described above. Reference signs in the claims are not to be regarded as a limitation.

LIST OF REFERENCE SIGNS

100 Dummy element
101 Dummy body
102 Illumination area
103 Graphic contours
104: Opening
105 Surface of the illumination area
106 Interior
107 Surrounding area
108 Supply cable
109 Energy source
110 Illuminant
111 Signal transmitter
201 Luminous body
202 Circuit board
203 Outlet region
204 Fastening region
300 Movable platform
301 First interface
302 Second interface

The invention claimed is:

1. A dummy element, comprising:
a dummy body having an illumination area which simulates an illumination device of an element to be simulated; and
an illuminant formed without a housing;
wherein the dummy body comprises an opening in the illumination area in which the illuminant is arranged,
wherein no housing and no frame, which are present in the opening, are formed around the illuminant itself,
wherein the illuminant comprises a luminous body and a circuit board,
wherein the dummy body is elastically deformable, and
wherein the circuit board is designed to be flexibly deformable.

2. The dummy element according to claim 1,
wherein the illumination area has graphic contours on its surface.

3. The dummy element according to claim 1,
wherein the illuminant is fixed in the opening by means of a press fit.

4. The dummy element according to claim 3,
wherein the opening and the illuminant form a clearance fit so that the illuminant is retractable into the opening like a drawer.

5. The dummy element according to claim 1,
wherein the illuminant is not enclosed by a housing, and
wherein the illuminant is fixed in the opening by at least one of an adhesive connection and/or a form fit.

6. The dummy element according to claim 1,
wherein the luminous body protrudes from the circuit board.

7. The dummy element according to claim 6,
wherein the circuit board is fixed in the opening of the dummy body and the luminous body protrudes from the opening.

8. The dummy element according to claim 6,
wherein the opening has an outlet region in the dummy body through which the luminous body projects outwardly and has a fastening region in the dummy body at which the circuit board is present.

9. The dummy element according to claim 6,
wherein the opening has an outlet region in the dummy body into which the luminous body fastened on the circuit board projects and lies completely within the outlet region, and has a fastening region in the dummy body at which the circuit board is present.

10. The dummy element according to claim 6,
wherein an opening diameter of an outlet region is smaller than an opening diameter of the fastening region so that the fastening region forms an undercut, and
wherein the dummy body is configured such that the circuit board can be pressed through the outlet region and, when present in the fastening region, forms a form fit for fastening the illuminant.

11. The dummy element according to claim 6,
wherein the illuminant comprises a plurality of luminous bodies, which are coupled to the circuit board,
wherein the opening in the dummy body has a plurality of outlet regions, and
wherein one of the luminous bodies is arranged in each outlet region.

12. The dummy element according to claim 6, further comprising:
a cooling device; and
wherein the cooling device is thermally coupled on the side of the circuit board facing away from the luminous body.

13. The dummy element according to claim 1,
wherein the opening is a through opening and connects an inner portion of the dummy body to the surface of the illumination area, and
wherein the illuminant is insertable through the opening from the inside.

14. The dummy element according to claim 1, comprising:
wherein the illuminant comprises an LED;
wherein the dummy body includes a foamed plastic; and
wherein the illumination area has graphic contours on its surface, wherein the graphic contours are applied to the illumination area via the application of a colorant and/or a sticker.

15. The dummy element according to claim 1,
wherein the illuminant has an induction coil by which energy can be supplied to the illuminant.

16. The dummy element according to claim 1,
wherein the illuminant comprises a signal transmitter, and
wherein the signal transmitter is configured to receive control signals for controlling the illuminant.

17. The dummy element according to claim 1,
wherein the illuminant has an acceleration sensor so that accelerations and decelerations can be measured.

18. A system for moving a dummy element, comprising:
a dummy body having an opening;
an illuminant arranged in the opening, wherein the illuminant is not enclosed by a housing, and wherein the illuminant is configured to simulate an illumination device; and
a movable platform;
wherein the dummy body is fastened on the movable platform, and
wherein no housing and no frame, which are present in the opening, are formed around the illuminant itself,
wherein the illuminant comprises a luminous body and a circuit board,
wherein the dummy body is elastically deformable,
wherein the circuit board is designed to be flexibly deformable.

19. The system according to claim 18,
wherein the dummy element has a first interface and the movable platform has a second interface, and
wherein the first interface and the second interface are configured to correspond to each other such that particular data signals or power are interchangeable between the platform and the dummy element.

* * * * *